Figure 1:
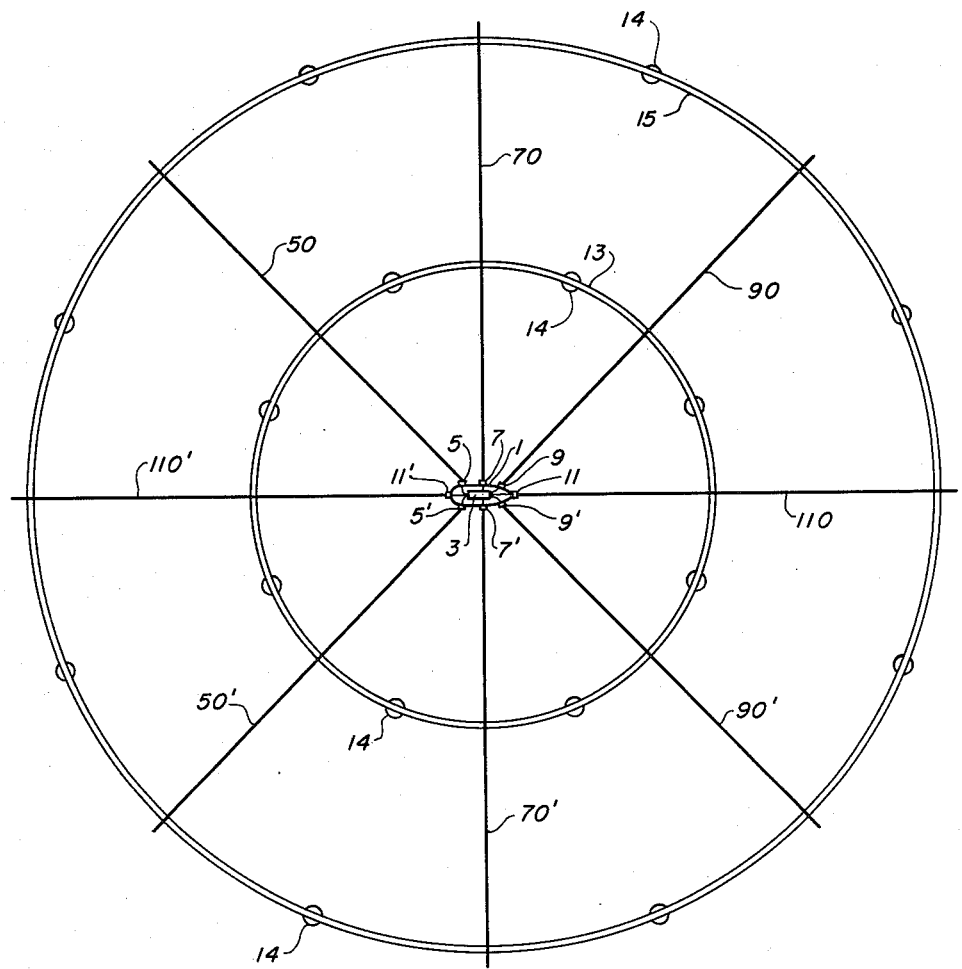

June 5, 1956          R. H. RINES          2,749,531

METHOD OF AND APPARATUS FOR DETECTION

Filed March 9, 1951          3 Sheets-Sheet 1

Inventor
Robert H. Rines
by Rines and Rines
Attorneys

June 5, 1956   R. H. RINES   2,749,531
METHOD OF AND APPARATUS FOR DETECTION
Filed March 9, 1951   3 Sheets-Sheet 3
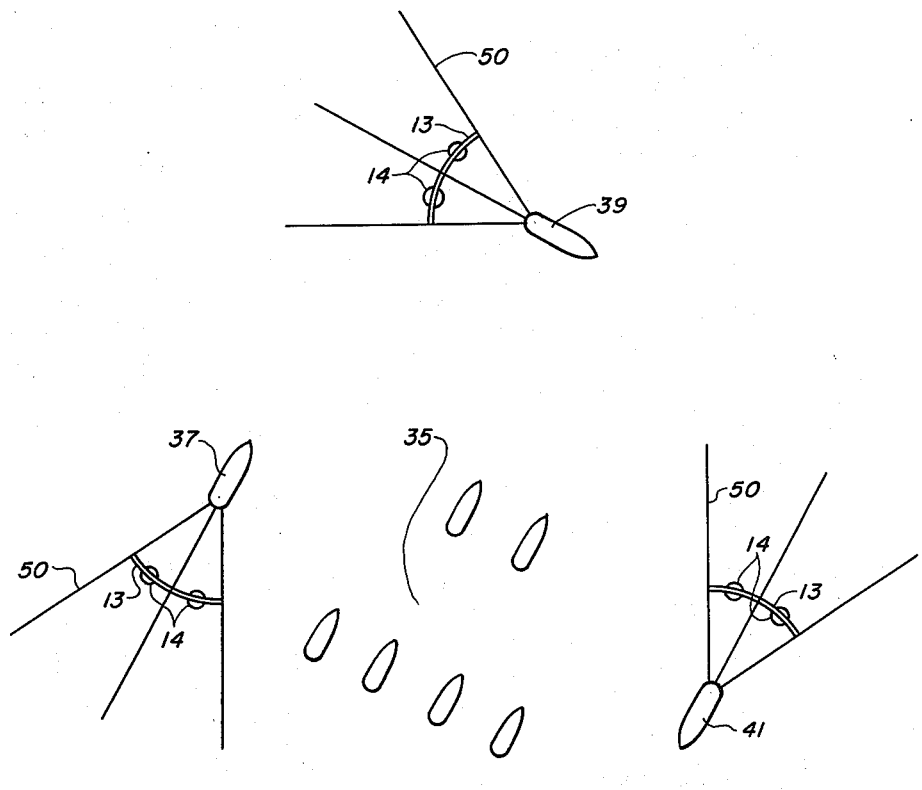
Fig. 8.
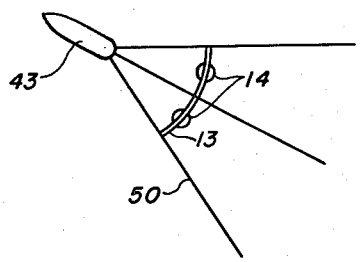
Inventor
Robert H. Rines
by Rines and Rines
Attorneys

United States Patent Office 2,749,531
Patented June 5, 1956

2,749,531
METHOD OF AND APPARATUS FOR DETECTION

Robert H. Rines, Newton, Mass.

Application March 9, 1951, Serial No. 214,805

29 Claims. (Cl. 340—6)

The present invention relates to methods and systems for increasing the range of sound-wave detection of underwater objects from reference locations.

Present-day underwater detecting systems, such as those utilizing pulses of sound waves or detecting sound waves emanating from underwater objects, are seriously handicapped by the properties of the water through which the sound waves travel. By the term "sound," as used in the specification and the claims, is meant not only the audible part of the sound spectrum, but also the ultrasonic spectrum, embracing, also, all kinds of elastic vibrations. Among the phenomena that limit the detectable underwater range of objects, such as submarines, are absorption, scattering, reflections, refraction, signal fluctuations, noise, and the attenuation caused by the water medium. In addition, interference from other sources of sound energy, such as shrimp, fish and other underwater life often handicaps reliable underwater ranging. Investigations have shown that there are no frequencies of sound-wave energy which escape these marked limiting phenomena. The problem of increasing the effective underwater sound-detection range has therefore been approached from other points of view, including the design of more powerful sound transducers. Other proposals have been to utilize sonobuoys and the like for increasing the range of detection. The problem, however, is still largely without satisfactory solution.

An object of the present invention is to provide a new and improved method of and system for extending the range of sound-wave detection of underwater objects from remote reference locations.

A further object is to provide a new and improved sound-transmitter-receiver-attachment apparatus.

Other and further objects will be hereinafter discussed and more fully pointed out in the appended claims.

The invention will now be explained in connection with the accompanying drawings Fig. 1 of which is a schematic top elevation illustrating a ship provided with an apparatus for extending the range of sound-wave detection constructed in accordance with the present invention; Figs. 2 to 7 and 9 are schematic diagrams of various types of sound-wave energy conducting systems that may be utilized in the system of Fig. 1; and Fig. 8 is a view of a modification adapted for the protection of convoys or other areas to be guarded.

In accordance with the present invention, instead of attempting to modify the water medium through which the sound waves must be propagated as, for example, by attempting to kill various organisms which are known to attenuate or absorb or scatter the sound energy, and instead of attempting to increase many fold the power of the transducer systems, a new medium is provided under water for the transmission of the sound waves that is not subject to the disadvantageous properties existing in the water itself. Though it has heretofore been discovered that sound-wave energy may be efficiently transmitted along sound conductors such as, for example, wires of appropriate cross section and material, such conductors have not been utilized to any great degree, and particularly, have not heretofore been applied in the field of underwater sound transmission. As described, for example, in the Technical Physics of the USSR, volume 2, 1935, by S. Sokoloff, on pages 542 to 544, sound waves may be propagated long distances along appropriate wire and other conductors with negligible attenuation. The use of wire conductors is also described in U. S. Letters Patent 2,063,947, issued on December 15, 1936, to George W. Pierce, and in Letters Patent No. 2,528,730, issued on November 7, 1950, to Robert H. Rines.

In accordance with the present invention, such sound conductors may be disposed under water, emanating from a reference location, such as a ship, and extending a considerable distance outward away from the reference location. The ship may be provided with a transmitting and/or receiving system equipped with a transducer for propagating sound energy along the wire conductors away from the ship or for receiving sound energy in the water and conducting the same to the ship. In transmitting, since the sound energy resulting at the free end of the wire conductor at a point remote from the reference location is substantially of the same order of magnitude as the original energy injected into the sound conductor by the transducer at the reference location, as the result of negligible attenuation of sound energy in such sound conductors, the effective range of this sound energy for the purpose of reflecting or scattering from objects to be detected, has been increased by an amount substantially equal to the length of the sound conductor.

During the period of the first World War, air tubes were utilized in conjunction with stethoscopes and the like as submarine listening devices, the ship carrying the device usually being stopped in the vicinity where the submarine was suspected, and the air tube arrays being lowered into the water. In order to prevent the interfering effects of the propellers of submarine-hunting ships, moreover, microphones and other electrical apparatus were also towed behind the ships by cables within which the electrical conductors were carried. Neither of these proposals, however, is related to the solution of the applicant's problem of providing a medium in the water through which present-day conventional transducers may transmit or receive sound waves over long distances from the ship or other detecting reference location despite the disadvantageous sound-transmission properties of the water.

While, moreover, the present invention will be described in connection with object detection, it is equally applicable to the problem of underwater communication with the aid of sound waves.

Referring to Fig. 1, for example, a ship is shown at a reference location 1 provided with a transmitting and/or receiving apparatus 3 for generating sound-wave energy or for evidencing the reception of such energy. The transmitting and/or receiving apparatus may energize or be connected to a plurality of transducers 5, 7, 9, 11 and 5', 7', 9', 11' disposed at different locations about the ship 1. Were these transducers to transmit sound waves as pulsed, continuous-wave or any other type of modulated vibrational energy, in various directions into the water, the effective range of detection of objects would be limited by the factors before discussed. Instead of propagating the sound waves into the water, however, each transducer is shown connected to a sound conductor that emanates from the reference location 1 in a particular direction. The transducer 5, for example, is connected to a sound conductor 50; the transducer 7, to a sound conductor 70; the transducer 9, to a sound conductor 90; and the transducer 11, to a sound conductor 110. The transducers 5', 7', 9' and 11' are similarly connected, respectively, to sound conductors 50', 70', 90' and 110'. The sound conductors 110 and 110' are shown emanating respectively fore and aft of the ship reference location 1. The sound conductors 70 and 70', on the other hand, project from the ship 1 in different directions, namely, to the port and to the starboard, respectively. The sound conductors 50 and 90 emanate in directions intermediate the directions formed by the sound conductors 110', 70 and 110, and the conductors 50' and 90' similarly emanate in directions intermediate the sound conductors 110', 70' and 110. The plurality or array of sound conductors, therefore, is formed somewhat in the nature of spokes of a wheel. They may be maintained under water in the positions shown by means of spacers 13 and 15 in the form of circular ribs. These spacers are preferably made of non-sound or -vibration conducting material such as light wood. The conductors themselves, or preferably, the supports 13, 15, may be provided with sea-anchors 14 and the like both in the systems of Figs. 1 and 8 to maintain them under water.

Considering transmission, though the same advantage holds for reception, the sound energy from the transmitter or generator 3 which energizes the respective transducers, is propagated along the plurality of sound conductors and, from the free ends of the conductors, into the water. Since the sound energy at the free ends of the sound conductors is substantially the same as the sound energy injected into the sound conductors by the transducers, because of the negligible attenuation of the sound conductors, the same range is attained for the detection of objects from the free ends of the sound conductors as would have been obtained from the transducers themselves had they directly propagated sound waves into the water. The effective range of sound-wave detection of underwater objects from the reference location 1, has therefore been extended by an amount substantially equal to the length of the sound conductors. It is, of course, to be understood that the sound conductors need not all have the same length, as shown, and may have other configurations such as are discussed, for example, in connection with the system of Fig. 8. The system of Fig. 1, moreover, is particularly adapted to a stationary ship or other location 1, such as a light ship, since it would be rather difficult to move the ship at any considerable speed with the sound conductor array being dragged under water. For a moving system, it is preferred to utilize a conductor configuration of the form illustrated in Fig. 8, though other forms, of course, will immediately suggest themselves to those skilled in the art.

It remains to discuss the details of the sound conductors and the manner in which they are energized by the transducers or carry sound energy to energize the transducers.

Figure 2:
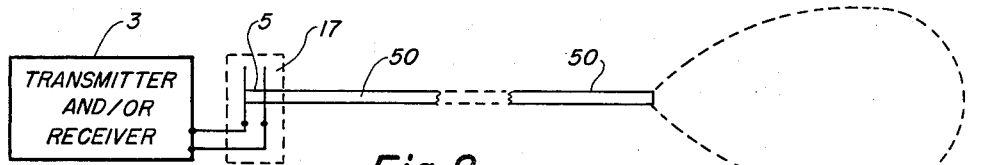
Figure 3:
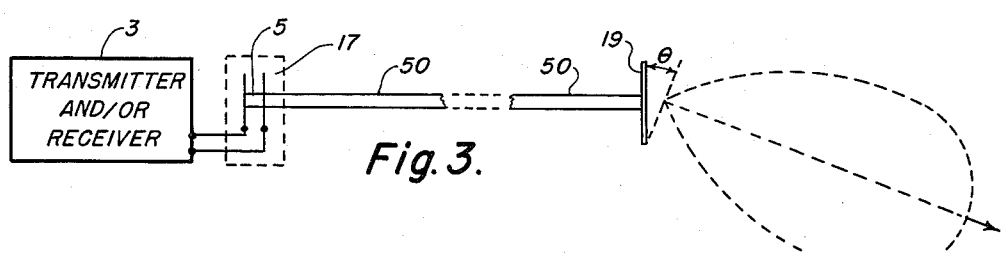

Referring to Fig. 2, the transmitter and/or receiver is shown at 3 connected to a transducer 5, shown as a piezoelectric crystal. The transmitter and/or receiver system 3 and the transducer 5 may assume any desired conventional form, and the transducer 5 may be of any other type such as, for example, of the magnetostrictive type hereinafter discussed in connection with the systems of Figs. 5 and 6. Instead of a single transducer, moreover, a plurality of transducers may be employed. Conventional piezoelectric and magnetostrictive transmitting and receiving systems with associated transducers are described, for example, in U. S. Letters Patent 2,014,410 through 2,014,413, issued on September 17, 1935, to the said George W. Pierce, and also in Letters Patent No. 2,063,950 issued on December 15, 1936, to R. L. Steinberger.

The piezoelectric crystal 5 is shown with one of its electrodes contacting the left-hand end of the sound conductor 50. The free end of the sound conductor 50 will radiate or receive the sound energy into or from the water in a more or less directive pattern as illustrated by the dotted line. It is thus apparent that the system of Fig. 1 will provide omnidirectional detection from the reference location 1 since each sound conductor will produce a sound field adjacent the sound field produced by the conductors disposed on either side thereof. The manner in which the transducer 5 may be attached to the sound conductor 50 is described, for example, in the before-mentioned Sokoloff article. The connection may be effected in an oil medium or it may be effected by screwing or otherwise fastening an end of the sound conductor into a coating placed upon the transducer to provide a good vibrational impedance match between the transducer and the conductor. To this end, the conductor may be tapered, not shown, near its connection to the transducer. The sound conductor may be attached to the transducer in other ways also. Since the transducer is preferably disposed in the water, however, there should be a seal between the transducer unit and the sound conductor, shown by the box 17. This box or housing 17 may be of the sealed oil bath nature described in the Sokoloff article or it may be a housing of the type described in the before-mentioned Steinberger patent, or any other desired form. The transducer 5 and its connection to the sound conductor 50 may, furthermore, be effected within a housing attached to the side of the vessel or it may be effected within the vessel, with the sound conductor 50 passing through the side of the vessel into the water.

As for the sound conductors themselves, they may assume the form of wire conductors as of copper, iron or any other desired material. Copper wire four millimeters in diameter has been successfully employed as a sound conductor for propagating sound energy injected therein from a piezoelectric crystal over distances up to five hundred meters with negligible attenuation, as described in the said Sokoloff paper. The frequency of the sound waves may vary from about 30 kilocycles up to megacycles. Higher frequencies and lower frequencies may, of course, also be utilized. Iron wires six millimeters in diameter have also successfully been used for the transmission of sound waves over long distances with negligible attenuation. With a transducer element 5 that produces one watt of sound energy of frequency of 100,000 kilocycles, the before-mentioned iron wire of six millimeters diameter will, according to calculation, conduct the sound energy 10,000 kilometers before the sound energy has become completely damped out. Copper wire has been found to attenuate the sound energy less than iron wire. The sound conductors, however, may be other than of metal. They may, for example, be of plastic material. As an illustration, polyethylene or Bakelite tubes may be utilized. The tubes may be hollow, filled with gas and sealed at high or low pressures, as is well known. A degree of flexibility or rigidity may be effected with such sound conductors through the use of appropriate plasticizers. In all cases, however, a medium is provided other than the water itself for carrying the sound-wave energy with negligible attenuation, and without any interference whatsoever from the various phenomena that render the water medium undesirable as a transmission medium for the sound waves, to a point remote from the reference location and closer to any desired underwater object that is to be located than the reference location. In all cases, therefore, the effective range of sound-wave detection of underwater objects from the reference location is extended by an amount substantially equal to the length of the sound conductors. In practice, the conductors in the system of Fig. 1, for example, may be a quarter of a mile long, more or less.

The sound conductors, moreover, are preferably covered with water-and-sound insulation. Rubber, for example, will protect the sound conductor from the water and will also sound proof, damp or shield the sound conductor from picking up stray radiations and from radiating energy into the water. Both transverse and longitudinal waves will be fed along the sound conductors by the transducers so that it may be important, where extreme range is desired, to prevent the sound conductor from radiating along its length into the water. Such a covering will permit substantially all of the energy to be radiated from the free end of the sound conductor. If desired, moreover, only predetermined portions of the conductor may be covered with the rubber or other covering so that the uncovered portions may radiate or receive sound waves into or from the water. The sound conductor 50, furthermore, need not extend straight out, as shown, but it may be curled in any desired form, such as in spiral form, if desired.

Figure 4:
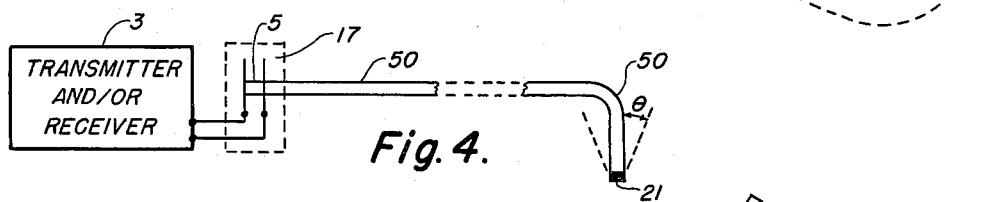

Instead of permitting the free end of the sound conductor to radiate directly into the water or to receive sound waves emanating from an object in the water, elements such as a transversely vibratory diaphragm 19 may be affixed to the end of the sound conductor 50 to impart further directionality to the transmitted or received sound energy and to effect better impedance matching between the conductor and the water. As before stated, in connection with the transducer end of the conductor, the free conductor end may be tapered to effect impedance matching, also. Such diaphragms are described, for example, in Letters Patent Nos. 2,063,944 and 2,063,945, issued to the said George W. Pierce on December 15, 1936, and also in the before-mentioned Patent No. 2,063,947. The diaphragms may assume the form of rods, strips, plates or discs, or any other form as therein discussed. The received or transmitted sound beam will have a directional characteristic, as illustrated by the dotted line in Fig. 3, the plane of the wave fronts of the transmitted or received sound waves making the Pierce angle $\theta$ with the plane of the diaphragm 19, where $\theta$ is the angle given by the relationship.

$$\sin \theta = \frac{V_0}{V}$$

where $V_0$ is the velocity of propagation of the sound energy in the water and $V$ is the velocity along the diaphragm 19. In this manner, the sound beams of the conductors may be directed at any desired angles as for the purpose of gap-filling the coverage of areas to be protected. If desired, moreover, the wire conductor itself may be utilized to radiate or receive in accordance with the Pierce angle as, for example, where it is bent as shown in Fig. 4. If it is desired to prevent radiation or reception on both sides of the radiating or receiving portion of the conductor 50, or for that matter, of the diaphragm 19 of Fig. 3, sound dampers such as, for example, the sound-insulating member 21 may be utilized as described in the said Letters Patent No. 2,063,945, in detail.

Figure 5:
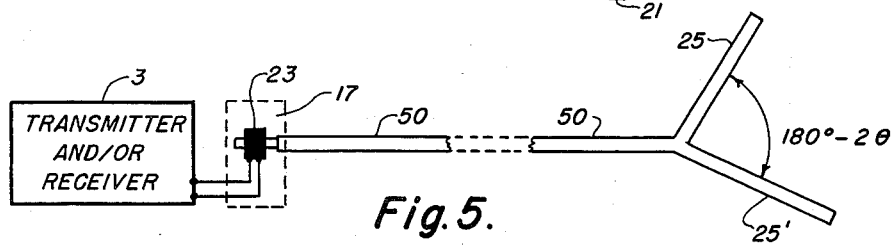
Figure 6:
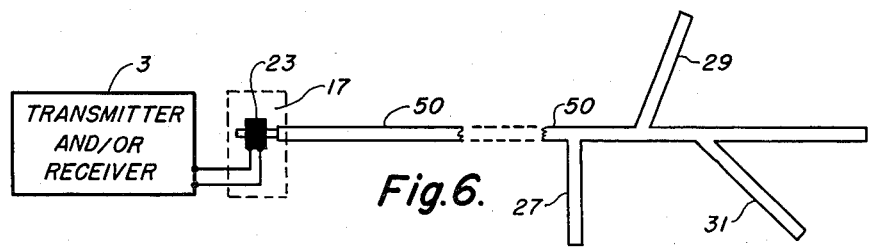

As another illustration, a dihedral or corner angle directional transverse plate transmitter or receiver may be provided by causing the conductor 50 to divide into a pair of branch conductors or diaphragm elements 25, 25', Fig. 5, preferably forming an angle between them given by the expression, 180 degrees minus $2\theta$. In the system of Fig. 5, for purposes of illustration, the transducer is illustrated at 23 as of the magnetostrictive type. It may, of course, comprise an array of elements as disclosed in the said Steinberger patent and in Letters Patent 2,405,472, issued on August 6, 1946, to Tuttle If it is desired, in addition, to cause radiation patterns or sound-energy-reception patterns to assume a plurality of different directions, the sound conductor 50 may be provided with branches such as 27, 29, 31, oriented at any angles to produce the desired result. The diaphragm 19 may, furthermore, if desired, be replaced by a piezoelectric element or any other type of vibratory device.

Figure 9:
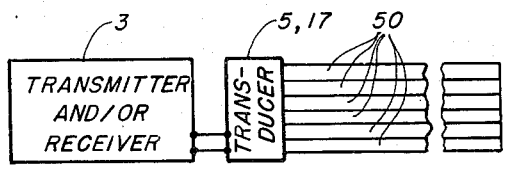

In Fig. 9, as a further illustration, a transducer 5, which may be of the type comprising a plurality of, for example, magnetostrictive or piezoelectric elements driving or being driven by a diaphragm, as disclosed in the before-mentioned Steinberger and Tuttle patents, is shown cooperating with an array of conductors 50 that may be secured to the said diaphragm. The use of a two-dimensional array of conductors 50 will, of course, improve both the horizontal and vertical directivity of the energy emanating from or received at the free ends of the conductors. A further diaphragm of equivalent device may, of course, be utilized at the said free ends, as discussed in connection with the system of Fig. 3. It is to be understood that any of these modifications illustrated in Figs. 2 to 7 and 9 may be utilized in connection with the systems of Figs. 1 and 8. It is also to be understood that, in accordance with all the embodiments of the invention, one conductor or conductor array may be used for transmission, and another for reception, as, for example, where it is desired to use continuous-wave instead of pulsed energy or where, for other reasons, it is not desired to use the same conductor or conductor array for both transmission and reception. Where pulsed energy is used, of course, the same conductor may alternately act to transmit and receive sound waves. It may be, furthermore, that in some applications, a conductor may be used only for transmission, and conventional transducer systems for reception, or vice versa.

While the system of Fig. 1 is particularly suited for relatively stationary reference locations, as before stated, a system adapted for moving arrangements is illustrated in Fig. 8. It may be desired to protect a convoy of ships 35 with the aid of destroyers. In accordance with present-day technique, the range within which the destroyers can detect underwater objects is limited by the properties of the water. If, however, the destroyers are equipped with sound conductors in the manner taught by the present invention, the effective range may be greatly increased. Surrounding the convoy 35 at a plurality of reference locations, therefore, are shown four destroyers 37, 39, 41 and 43. Trailing from the stern of each of the destroyers are a plurality of sound conductors 50 preferably separated by a spacer 13. With the three conductors shown for each destroyer, a substantial sector will be covered by each destroyer. If the destroyers circle the convoy 35 in the manner shown, so that the reference locations at which sound waves are received are disposed at regions that, in effect, surround the given area of the convoy 35, complete coverage may be given to the convoy 35 with ranges of sound-wave detection of underwater objects from a plurality of points remote from the destroyers 37, 39, 41 and 43 effected. Any of the systems of Figs. 2 to 7 and 9 may be utilized in the system of Fig. 8. If the sound conductors are of flexible plastic or flexible wire, they may be reeled in and out for use and non-use or for increasing or limiting the desired range to be covered, with sea anchors or the like being attached at appropriate locations along the wire or along the supports, as shown.

Figure 7:
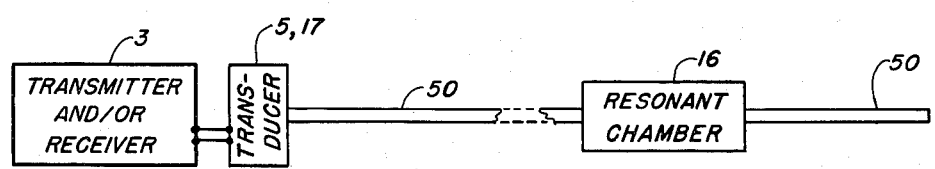

Vibration filters, such as well-known resonant acoustic chambers 16 may be inserted anywhere along the wire conductors 50 to transmit or receive signals of particular frequency or frequency bands to the exclusion of undesired signals, as shown in Fig. 7. No such exclusion is, of course, possible where the water is used as the sound-propagating medium. Interference, however, from reflections and scattering are virtually eliminated up to the free ends of the wire conductors of the present invention in transmission, and from the free ends of the wire conductors in reception, whereas equivalent transmission or reception in the water would result in all kinds of reflections, refraction, absorption, fluctuations and other interfering effects, before discussed.

Further modifications will occur to those skilled in the art and all such are considered to fall within the spirit and scope of the present invention as defined in the appended claims.

What is claimed is:

1. A method of extending the range of sound-wave detection of an underwater object from a reference location that comprises receiving sound waves from the object at a point in the water remote and spaced a considerable distance outward away from the reference location and a considerable distance closer to the underwater object than the reference location, and conducting the sound waves received from the object at the remote point along a medium other than the water to the reference location.

2. A method of extending the range of sound-wave detection of an underwater object from a reference location that comprises conducting sound waves from the reference location along a medium other than the water to a point in the water remote and spaced a considerable distance outward away therefrom and closer a considerable distance to the underwater object than the reference location, and radiating the conducted sound waves into the water at the remote point.

3. A method of extending the range of sound-wave detection of an underwater object from a reference location that comprises conducting sound waves from the reference location along a medium other than the water to a point in the water remote and spaced a considerable distance outward away therefrom, radiating the conducted sound waves into the water at the remote point, receiving the radiated sound waves at the remote point after reflection and scatter from the object, and conducting the sound waves received from the object at the remote point along the said medium to the reference location.

4. Apparatus for extending the range of sound-wave detection of an underwater object from a reference location having, in combination, means for receiving sound waves from the object at an underwater point remote and spaced a considerable distance outward away from the reference location and a considerable distance closer to the underwater object than the reference location and for conducting the received sound waves from the remote point to the reference location, and means at the reference location for evidencing the reception of the conducted sound waves.

5. Apparatus for extending the range of sound-wave detection of an underwater object from a reference location having, in combination, means for generating sound waves at the reference location, and sound-conducting means connected to the generating means for conducting sound waves from the reference location to an underwater point remote and spaced a considerable distance outward away therefrom and closer a considerable distance to the underwater object than the reference location.

6. Apparauts of the character described having, in combination, sound transmitting or receiving means disposed at a reference location and sound-conducting means connected to the sound transmitting or receiving means along which sound waves may be propagated to or from an underwater point remote and spaced a considerable distance outward away from the reference location.

7. Apparatus for extending the range of sound-wave detection of an underwater object from a reference location having, in combination, sound transmitting or receiving means disposed at the reference location and sound-conducting means disposed underwater and connected to the sound transmitting or receiving means along which sound waves may be propagated to or from a point in the water remote and spaced a considerable distance outward away from the reference location and closer a considerable distance to the underwater object than the reference location.

8. Apparatus for extending the range of sound-wave detection of an underwater object from a reference location having, in combination, sound transmitting or receiving means comprising electric transducer means disposed at the reference location, and sound-conducting means mechanically connected to the transducer means along which sound waves may be propagated to or from a point in the water remote and spaced a considerable distance outward away from the reference location and closer a considerable distance to the underwater object than the reference location.

9. Apparatus for extending the range of sound-wave detection of an underwater object from a reference location having, in combination, sound transmitting or receiving means disposed at the reference location and sound-conducting means comprising a solid metal rod connected to the sound transmitting or receiving means along which sound waves may be propagated to or from a point in the water remote and spaced a considerable distance outward away from the reference location and closer a considerable distance to the underwater object than the reference location.

10. Apparatus for extending the range of sound-wave detection of an underwater object from a reference location having, in combination, sound transmitting or receiving means disposed at the reference location and sound-conducting means comprising a hollow tube connected to the sound transmitting or receiving means along which sound waves may be propagated to or from a point in the water remote and spaced a considerable distance outward away from the reference location and closer a considerable distance to the underwater object than the reference location.

11. Apparatus for extending the range of sound-wave detection of an underwater object from a reference location having, in combination, sound transmitting or receiving means disposed at the reference location and sound-conducting means comprising a gas-filled tube connected to the sound transmitting or receiving means along which sound waves may be propagated to or from a point in the water remote and spaced a considerable distance outward away from the reference location and closer a considerable distance to the underwater object than the reference location.

12. Apparatus for extending the range of sound-wave detection of an underwater object from a reference location having, in combination, sound transmitting or receiving means disposed at the reference location and sound-conducting means comprising a plurality of differently oriented sound conductors connected to the sound transmitting or receiving means along which sound waves may be propagated to or from a point in the water remote and spaced a considerable distance outward away from the reference location and closer a considerable distance to the underwater object than the reference location.

13. Apparatus for extending the range of sound-wave detection of an underwater object from a reference location having, in combination, sound transmitting or receiving means disposed at the reference location, sound-conducting means connected to the sound transmitting or receiving means along which sound waves may be propagated to or from a point in the water remote and spaced a considerable distance outward away from the reference location and closer a considerable distance to the underwater object than the reference location, and means comprising a transversely vibratory diaphragm and disposed at the remote point.

14. Apparatus for extending the range of sound-wave detection of an underwater object from a reference location having, in combination, sound transmitting or receiving means disposed at the reference location and sound-conducting means provided with vibration damping means connected to the sound transmitting or receiving means along which sound waves may be propagated to or from a point in the water remote and spaced a considerable distance outward away from the reference location and closer a considerable distance to the underwater object than the reference location.

15. Apparatus for extending the range of sound-wave detection of an underwater object from a reference location having, in combination, sound transmitting or receiving means disposed at the reference location and sound-conducting means comprising a sound conductor provided with a plurality of branch conductors connected to the sound transmitting or receiving means along which sound waves may be propagated to or from a point in the water remote and spaced a considerable distance outward away from the reference location and closer a considerable distance to the underwater object than the reference location.

16. Apparatus for extending the range of sound-wave detection of an underwater object from a reference location having, in combination, sound transmitting or receiving means disposed at the reference location and sound-conducting means disposed underwater and connected to the sound transmitting or receiving means along which sound waves may be propagated to or from a point in the water remote and spaced a considerable distance outward away from the reference location and closer a considerable distance to the underwater object than the reference location and means disposed at the remote point and connected to the sound-conducting means for transmitting or receiving sound waves into or from the water.

17. Apparatus for extending the range of sound-wave detection of underwater objects from a reference location having, in combination, sound transmitting or receiving means disposed at the reference location and a plurality of sound-conducting means connected to the sound transmitting or receiving means along which sound waves may be propagated to or from a plurality of points in the water remote and spaced a considerable distance outward away from the reference location and closer a considerable distance to the underwater objects than the reference location.

18. Apparatus for extending the range of sound-wave detection of an underwater object from a reference location having, in combination, sound transducer means disposed at the reference location, and a two-dimensional array of sound-conducting means connected to the transducer means along which sound waves may be propagated to or from an underwater point remote and spaced a considerable distance outward away from the reference location and closer a considerable distance to the object than the reference location.

19. Apparatus of the character described having, in combination, sound transmitting or receiving means disposed at a reference location, sound-conducting means connected to the sound transmitting or receiving means along which sound waves may be propagated to or from an underwater point remote and spaced a considerable distance outward away from the reference location, and means for excluding undesired sound frequencies.

20. A method of extending the range of sound-wave detection of underwater objects that may be located in widely different directions from a given area that comprises, receiving sound waves from the objects at a plurality of points in the water remote and spaced considerable distances away from a plurality of reference locations disposed about the given area, indicating to the reference locations the receipt of the sound waves at the corresponding remote points, and maintaining the reference locations continually disposed about the given area in order to detect the objects.

21. Apparatus of the character described having, in combination, sound transmitting or receiving means disposed at a reference location and flexible-walled sound-conducting means connected to the sound transmitting or receiving means along which sound waves may be propagated toward or from an underwater point remote and spaced a considerable distance large compared to the wavelength of the sound waves outward away from the reference location, the sound-conducting means directionally transmitting or receiving sound waves along the walls thereof into or from the water.

22. Apparatus of the character described having, in combination, sound transmitting or receiving means disposed at a reference location and flexible-walled sound-conducting means connected to the sound transmitting or receiving means along which sound waves may be propagated toward or from an underwater point remote and spaced a considerable distance large compared to the wavelength of the sound waves outward away from the reference location, the sound-conducting means directionally transmitting or receiving sound waves at the free end into or from the water.

23. Apparatus of the character described having, in combination, sound transmitting or receiving means disposed at a reference location and flexible-walled sound-conducting tube means connected to the sound transmitting or receiving means along which sound waves may be propagated toward or from an underwater point remote and spaced a considerable distance large compared to the wavelength of the sound waves outward away from the reference location, the sound-conducting means directionally transmitting or receiving sound waves along the walls thereof into or from the water.

24. Apparatus of the character described having, in combination, sound transmitting or receiving means disposed at a reference location and a plurality of substantially coextensive flexible-walled sound-conducting means connected to the sound transmitting or receiving means along which sound waves may be propagated toward or from an underwater point remote and spaced a considerable distance large compared to the wavelength of the sound waves outward away from the reference location, the sound-conducting means directionally transmitting or receiving sound waves along the walls thereof into or from the water.

25. Apparatus of the character described having, in combination, sound transmitting or receiving means disposed at a reference location and flexible-walled sound-conducting means connected to the sound transmitting or receiving means along which sound waves may be propagated toward or from an underwater point remote and spaced a considerable distance large compared to wavelength of the sound waves outward away from the reference location, the sound-conducting means being terminated by a sound-conducting surface and directionally transmitting or receiving sound waves along the walls thereof into or from the water.

26. Apparatus of the character described having, in combination, sound transmitting or receiving means disposed at a reference location and flexible-walled sound-conducting means connected to the sound transmitting or receiving means along which sound waves may be propagated toward or from an underwater point remote and spaced a considerable distance large compared to the wavelength of the sound waves outward away from the reference location, the sound-conducting means being provided at a predetermined region with sound-damping material and directionally transmitting or receiving sound waves along the walls thereof into or from the water.

27. Apparatus of the character described having, in combination, sound transmitting or receiving means disposed at a reference location and flexible-walled sound-conducting means connected to the sound transmitting or received means along which sound waves may be propagated toward or from an underwater point remote and spaced a considerable distance large compared to the wavelength of the sound waves outward away from the reference location, the sound-conducting means being terminated with a sound-damping material and directionally transmitting or receiving sound waves along the walls thereof into or from the water.

28. Apparatus of the character described having, in combination, sound transmitting or receiving means disposed at a reference location and flexible-walled sound-conducting means connected to the sound transmitting or receiving means along which sound waves may be propagated toward or from an underwater point remote and spaced a considerable distance large compared to the wavelength of the sound waves outward away from the reference location, the sound-conducting means directionally transmitting or receiving sound waves along the walls thereof into or from the water in a direction oriented at an angle $\theta$ with respect to a plane perpendicular to the direction of propagation of the sound waves along the sound-conducting means determined substantially by the formula $$\sin \theta = \frac{V_0}{V}$$

where $V_0$ is the velocity of propagation of the sound waves in the water and $V$ is the velocity along the sound-conducting means.

29. Apparatus as claimed in claim 28 and in which the sound-conducting means is curved.

References Cited in the file of this patent

UNITED STATES PATENTS

| | | |
|---|---|---|
| 948,424 | Long | Feb. 8, 1910 |
| 1,380,869 | Fay | June 7, 1921 |
| 1,381,640 | Horton | June 14, 1921 |
| 1,411,948 | Williams | Apr. 4, 1922 |
| 1,936,706 | Affel | Nov. 28, 1933 |
| 2,044,807 | Noyes | June 23, 1936 |
| 2,063,947 | Pierce | Dec. 15, 1936 |
| 2,401,929 | Hammond | May 4, 1942 |
| 2,424,722 | Rieber | July 29, 1947 |
| 2,514,080 | Mason | July 4, 1950 |

FOREIGN PATENTS

| | | |
|---|---|---|
| 9,912 | Great Britain | Mar. 13, 1919 |

OTHER REFERENCES

Carlin: Ultrasonics, first ed., published (1949) by McGraw-Hill Book Co., Inc., New York, N. Y., pages 18–22 and 27.